United States Patent [19]

Marchello

[11] 3,874,730

[45] Apr. 1, 1975

[54] BICYCLE SEAT

[76] Inventor: John L. Marchello, 9934 Daleview, South Lyon, Mich. 48178

[22] Filed: Dec. 12, 1973

[21] Appl. No.: 426,684

[52] U.S. Cl. .............................. 297/452, 297/202
[51] Int. Cl. ..................... A47c 7/02, B62j 1/00
[58] Field of Search ........... 297/452, 195, 201, 204; 5/120, 127–130

[56] References Cited
UNITED STATES PATENTS

| | | | |
|---|---|---|---|
| 294,645 | 3/1884 | Lillibridge | 297/202 |
| 337,171 | 3/1886 | Lillibridge | 297/202 |
| 1,006,331 | 10/1911 | Williamson | 5/127 |
| 2,353,220 | 7/1944 | Charlop | 5/128 |
| 2,699,201 | 1/1955 | Levy | 5/127 X |

*Primary Examiner*—Paul R. Gilliam
*Attorney, Agent, or Firm*—Cullen, Settle, Sloman & Cantor

[57] ABSTRACT

A bicycle seat formed of an elongated U-shaped seat frame mounted transversely of the bicycle frame, and a pair of elongated bars each pivotally connected at its center to one of the legs of the seat frame and arranged generally transversely to the seat frame. A flexible strip extends between, and has its opposite ends connected to the bars, to form a flexible, elongated seat portion arranged generally horizontally and transversely of the bicycle frame.

6 Claims, 5 Drawing Figures

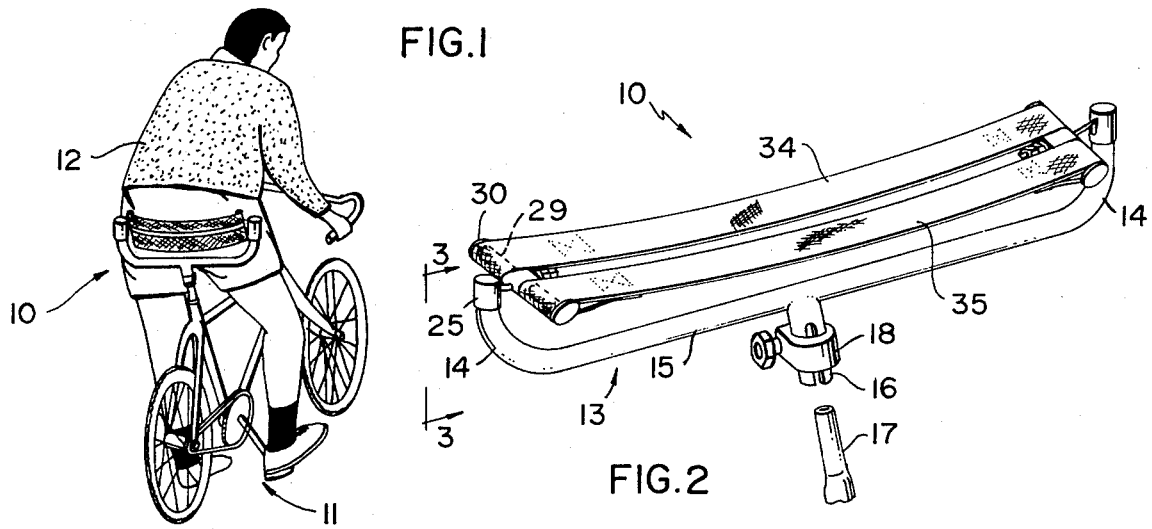
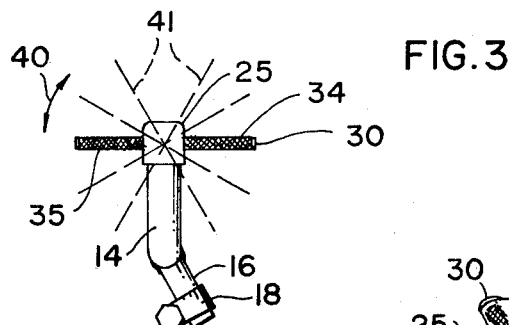
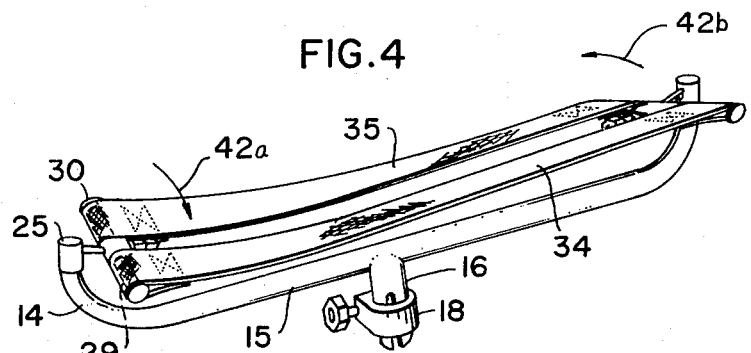
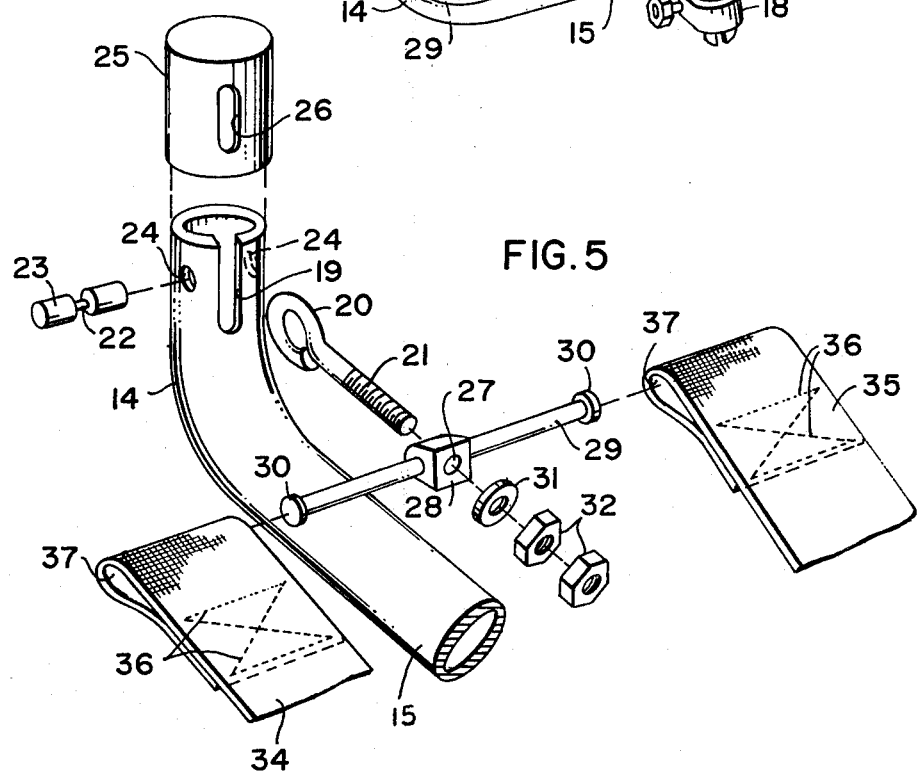

BICYCLE SEAT

BACKGROUND OF INVENTION

Conventional bicycle seats or saddles are shaped to fit between the legs, and in the crotch area of the bicycle rider. Because such seats are relatively uncomfortable, and tend to abrade the legs of the rider during movement of the legs, efforts in the past have been made to change the various sizes and shapes of such type of seats and also to include various types of pads or springs. However, such type seats are inherently uncomfortable, particularly for long periods of bicycle riding, since, regardless of the shape or size, the loads caused by the weight of the rider and also by bumps and jolts all tend to concentrate in one small area of the rider's anatomy.

Hence, the invention herein relates to an improved type of bicycle seat of a hammock-like constructions, which supports and suspends the entire backside of the rider and thus distributes over a much wider area, the loads caused by weight, jolting, etc., to produce a more comfortable seat.

The invention herein contemplates a seat which may be mounted upon any conventional bicycle frame, regardless of style or size, as a replacement for conventional bicycle seats.

SUMMARY OF INVENTION

The invention herein contemplates forming a bicycle seat in a hammock-like shape comprising a U-shaped frame with a flexible, elongated strip suspended between the upturned legs of the frame and mounted thereto for pivotal and flexible movement relative to the frame. The strip, which is arranged transversely to the plane of the bicycle frame, supports the entire backside area of the rider and flexes and pivots with the movement of the rider's body.

Preferably, the seat strip is formed of a pair of relatively narrow, elongated webbing material members arranged side-by-side in a generally common plane, with each strip being slightly movable relative to the other for increased flexibility. The opposite ends of the strip are fastened to cross bars, each centrally and pivotally secured to the frame upturned ends so that one end of the seating strip may pivot in one direction while the opposite end pivots in an opposite direction, in accordance with the relative movement of the rider's legs and hips.

The construction contemplated herein is simple and relatively inexpensive, and is formed so as to be readily interchangeable with a standard bicycle seat found on any conventional bicycle. An advantage of such construction is that the seat portions move with the rider's body to substantially eliminate relative motion between the seat and the rider's body as is common in conventional seats, thereby eliminating uncomfortable friction and abrasion.

These and other objects and advantages of this invention will become apparent upon reading the following description, of which the attached drawings form a part.

DESCRIPTION OF DRAWINGS

FIG. 1 illustrates, in perspective, a bicycle including the improved seat herein, with a rider, schematically shown, mounted thereon, to show the relative positioning between the seat and the rider.

FIG. 2 is a perspective view of the seat.

FIG. 3 is a side view taken in the direction of arrows 3—3 of FIG. 2.

FIG. 4 is a perspective view of the seat showing relative movement between opposite parts of the seat.

FIG. 5 is a perspective, disassembled view of one end of the seat.

DETAILED DESCRIPTION

FIG. 1 illustrates the improved seat 10 secured upon the frame of a conventional bicycle 11 and carrying a rider 12. The seat is arranged transversely of the bicycle frame and spans the backside of the rider.

The seat includes a seat frame 13, preferably formed of straight rigid tubing, whose opposise dnds are bent upwardly to form legs 14 connected by the straight base 15. Secured centrally of the base, as by welding, is a mounting stub shaft 16 of sufficient length to be inserted within the conventional bicycle frame seat shaft socket 17 and to be fastened therein and held against movement by a conventional clamping collar 18. The height of the seat relative to the bike frame may be adjusted by movement of the stub shaft relative to its receiving socket.

Referring to FIG. 5, each of the free ends of the legs 14 is provided with a slot 19 which receives the ring portion 20 of an eye-bolt 21. The ring is received around a reduced center bearing portion 22 of a cross pin 23 which may be fastened in place in a rivet-like fashion through aligned holes 24 formed in the legs.

A plastic cap 25 may be fitted over the free end of the legs, with the bolt extending through a slot 26 in the cap, for appearance purposes as well as to cover the relatively sharp ends of the tubing.

The bolt 21 is freely journalled through a central opening 27 in the enlarged central portion 28 of a cross bar 29 whose opposite ends are provided with enlarged heads 30. The bolt may be fastened relative to the central portion 28 by means of a conventional washer 31 and lock nut 32.

The seating strip which extends between the legs, is preferably formed of a pair of elongated, flexible, stretch resistant web belts 34 and 35, which may be of the type used in conventional automobile seat belts. By way of example, such strips or belts may each be approximately two inches in width and are arranged side by side in a common plane, spaced apart roughly one-half inch.

The opposite ends of the two strips are folded or looped over and fastened by stitches 36 to form opposite end loops 37 which receive the opposite free ends of the cross bar 29 and which are secured against lateral motion relative to the cross bar ends by abutting the enlarged central portion 28 and the enlarged head portions 30.

Alternatively, the seating strip may be formed of a single strip of webbing-like material whose opposite ends are similarly looped, as above, but to receive both of the opposite ends of the bar. In such case a central opening must be provided in the loop to receive the bolt 21. However, the pair of strips are preferable in that they provide great flexibility and relative movement and thereby more comfort.

As indicated in FIGS. 1 and 2, the improved seat herein is mounted upon a standard or conventional bicycle frame, replacing the conventional saddle bicycle seat. Because of the pivotal connections between the ends of the seating strip and the U-shaped frame, the seating strip may be pivoted, as indicated by the arrow 40 in FIG. 3, into various angular positions, indicated by dotted lines 41, to properly support the backside of the rider as he either sits more or less upright upon the bicycle.

. As the rider moves his legs to pedal the bicycle, the seating strip moves with the supported portions of the body, as illustrated in FIG. 4 which show by arrows 42a and 42b the reverse pivotal movement of the opposite ends of the seating strip. Thus, there is substantially no relative movement between the rider's body and the supporting strip, thereby eliminating the friction and abrasion which is commonly encountered in conventional seats. In essence, the seat forms a hammock-like support for the rider's body, moving and flexing and twisting with the body and tilting forwardly and rearwardly in response to the seating position of the rider.

Having fully described in operative embodiment of this invention, I now claim:

1. In a bicycle having a longitudinal axis extending generally from the front to the rear thereof, and a mounting attachment for a seat, wherein the improvement comprises an improved seat mounted on said attachment, comprising:
   an elongated, U-shaped seat frame having a pair of generally parallel upwardly extending legs interconnected by an elongated base portion having a longitudinal axis generally perpendicular to the bicycle longitudinal axis;
   an elongated, relatively narrow, flexible seating strip formed of a relatively stretch resistant material, extending between said legs above and generally longitudinally centered relative to said seat frame base to define a seat supporting surface extending generally perpendicular to the bicycle longitudinal axis to cradle a rider's hips or legs; and
   fastening means securing the opposed ends of said seating strip to a respective seat frame leg, each of said fastening means being independently pivotally interconnected with respect to each respective seat frame leg about an axis generally perpendicular to the bicycle longitudinal axis for independent or simultaneous pivoting of said fastening means to enable pivotal twisting of the seating strip during pedaling or simultaneous pivoting to accomodate different rider positions, said fastening means including cross bar members supporting respective opposed ends of said seating strip, a pin attached to each of said legs, and a member supported by each of said pins and being releasably and swivelly interconnected with each respective cross bar.

2. For a bicycle having a longitudinal axis extending generally from the front to the rear thereof, and a mounting attachment for a seat; an improved seat mounted on said attachment, comprising:
   an elongated, U-shaped seat frame having a pair of generally parallel upwardly extending legs interconnected by an elongated base portion having a longitudinal axis generally perpendicular to the bicycle longitudinal axis;
   an elongated, relatively narrow, flexible seating strip formed of a relatively stretch resistant material, extending between said legs above and generally longitudinally centered relative to said seat frame base to define a seat supporting surface extending generally perpendicular to the bicycle longitudinal axis to cradle a rider's hips or legs; and
   fastening means securing the opposed ends of said seating strip to a respective seat frame leg, each of said fastening means being independently pivotally interconnected with respect to each respective seat frame leg about an axis generally perpendicular to the bicycle longitudinal axis for independent or simultaneous pivoting of said fastening means to enable pivotal twisting of the seating strip during pedaling or simultaneous pivoting to accomodate different rider positions, said fastening means including transverse members supporting the respective opposed ends of said seating strip, a support member carried by each of said legs, and interconnecting members supported by respective support members and pivotally interconnecting each support member to a respective transverse member.

3. The combination as defined in claim 1 and said seating strip being formed of a pair of narrow belt-like strip members, arranged side by side and in a generally common plane.

4. A bicycle seat as defined in claim 2, and said seating strip comprising a pair of narrow, belt-like strip members arranged side by side in a common plane and on the opposite sides of each of the transverse members.

5. A bicycle seat as defined in claim 4, characterized by said interconnecting members each extending towards the opposite leg and being generally axially aligned.

6. A bicycle seat as defined in claim 4 and said seat frame being formed of an elongated, generally straight, rigid tube having its opposite ends bent upwardly to form said legs, and with a short stub shaft secured to the center of the tube and extending generally downwardly of the seat for securement to the bicycle frame, for thereby fastening the seat to said bicycle frame.

* * * * *